United States Patent [19]
Takahashi

[11] 3,970,779
[45] July 20, 1976

[54] POWER SUPPLY CIRCUIT

[75] Inventor: Shigenori Takahashi, Yokohama, Japan

[73] Assignee: Sony Corporation, Tokyo, Japan

[22] Filed: July 17, 1974

[21] Appl. No.: 489,083

[30] Foreign Application Priority Data
July 24, 1973   Japan.................... 48-83275

[52] U.S. Cl..................... 178/7.3 R; 178/DIG. 11; 178/7.5 R
[51] Int. Cl.².............................. H04N 5/44
[58] Field of Search............... 178/7.3 R, 7.2, 7.5 R, 178/DIG. 11; 315/411, 364, 370, 391, 393, 394; 307/11, 17, 31, 32, 36–38; 325/492

[56] References Cited
UNITED STATES PATENTS

| | | | |
|---|---|---|---|
| 3,519,741 | 7/1970 | Knight | 178/7.5 R |
| 3,641,267 | 2/1972 | Cavallari | 325/492 |
| 3,737,572 | 6/1973 | Frizane et al. | 178/7.3 R |
| 3,742,242 | 6/1973 | Morio et al. | 178/7.5 R |
| 3,745,246 | 7/1973 | Kashiwagi | 178/7.5 R |
| 3,752,903 | 8/1973 | Newman et al. | 178/7.5 R |
| 3,828,123 | 8/1974 | Sato | 178/7.3 R |
| 3,872,371 | 3/1975 | Williams | 307/36 |

*Primary Examiner*—Robert L. Griffin
*Assistant Examiner*—Jin F. Ng
*Attorney, Agent, or Firm*—Lewis H. Eslinger; Alvin Sinderbrand

[57] ABSTRACT

In a power supply circuit for supplying stabilized relatively low DC voltages to at least first and second load circuits as operating power voltages for the latter without the use of a power transformer, and in which the first and second load circuits are connected in series to each other across a DC voltage source supplying a relatively high DC voltage for dividing the latter between the first and second load circuits in accordance with their respective impedances; an additional DC voltage souce is connected between both load circuits to produce an additional DC voltage varying in response to variations in the voltage applied across the first load circuit, for example, as a result of variations in the impedance of the latter, and to apply the additional DC voltage to the second load circuit so as to compensate for the variations in the voltage applied across said second load circuit as a result of the variations in the voltage applied across the first load circuit, thereby to stabilize the relatively low DC voltages applied to both load circuits.

5 Claims, 2 Drawing Figures

POWER SUPPLY CIRCUIT

BACKGROUND OF THE INVENTION

1. Field of the Invention

This invention relates generally to power supply circuits, and more particularly is directed to an improved circuit for supplying stabilized operating DC voltages to a plurality of load circuits.

2. Description of the Prior Art

In an electric apparatus, such as television receivers, a radio receivers or the like, having circuits of which include transistors and other semiconductor devices and which are supplied with operating power from a commercial electric power lines, the limits of the endurable voltage of the transistors and other semiconductor device and/or desired reductions of power consumption, make it necessary to produce relatively low DC voltages from the AC voltage of the commercial electric power lines for application, as operating DC voltages, to the circuits in which the transistors and other semiconductor devices are included. In such cases, the AC voltage, for example, having a value of 100 volts, of the commercial electric power lines is usually stepped down by a power transformer, and the stepped down AC voltage is rectified to provide the relatively low DC operating voltages, for example, in the range of 12 to 50 volts. However, in apparatus using transistorized circuits a relatively large current flows through a power supply circuit, and therefore a relatively large power transformer is required with the result that the weight of the apparatus and the cost of the latter are undesirably increased.

To avoid the above disadvantages, it has been proposed to provide a circuit arrangement without the power transformer in which plural load circuits, for example, a horizontal deflection circuit and a vertical deflection circuit of a television receiver, are connected in series between output terminals of a rectifier circuit which produces a relatively high DC voltage at its output terminals by directly rectifying the AC voltage of the commercial electric power lines. In this case, the load circuits are supplied with respective relatively low DC voltages by dividing the high DC voltage obtained at the output terminals of the rectifier circuit. However, there is still the disadvantage that variation in the impedance of one of the load circuits causes variations in the low DC voltages applies to the respective load circuits, because the low DC voltages applied to the load circuits are obtained by dividing the high DC voltage in proportion to the respective impedances of the series connected load circuits.

SUMMARY OF THE INVENTION

Accordingly, it is an object of the present invention to provide an improved power supply circuit for producing DC operating voltages without using a power transformer.

A more specific object of the invention is to provide an improved power supply circuit, in which a plurality of load circuits are connected in series between output terminals of a rectifier circuit which directly rectifies an AC voltage from a supply source to provide a relatively high DC voltage at such output terminals, as aforesaid, and in which the resulting low DC voltages respectively applied to the load circuits are stabilized, that is, are not subject to variations in response to variations in the impedance of either of the load circuits.

In accordance with an aspect of this invention, the low DC voltages applied to the load circuits by a power supply circuit, as aforesaid, are stabilized by providing a control means connected to the load circuits for producing an additional DC voltage varying in response to variations in the DC voltage applied across one of the load circuits, and by applying such additional DC voltage to another load circuit to compensate for the variations in the DC voltage applied across that other load circuit resulting from the variations in the DC voltage applied across the said one load circuit.

The above, and other objects, features and advantages of the present invention, will be apparent from the following description taken in conjunction with the accompanying drawing.

DESCRIPTION OF THE PREFERRED EMBODIMENTS

Figure 1:
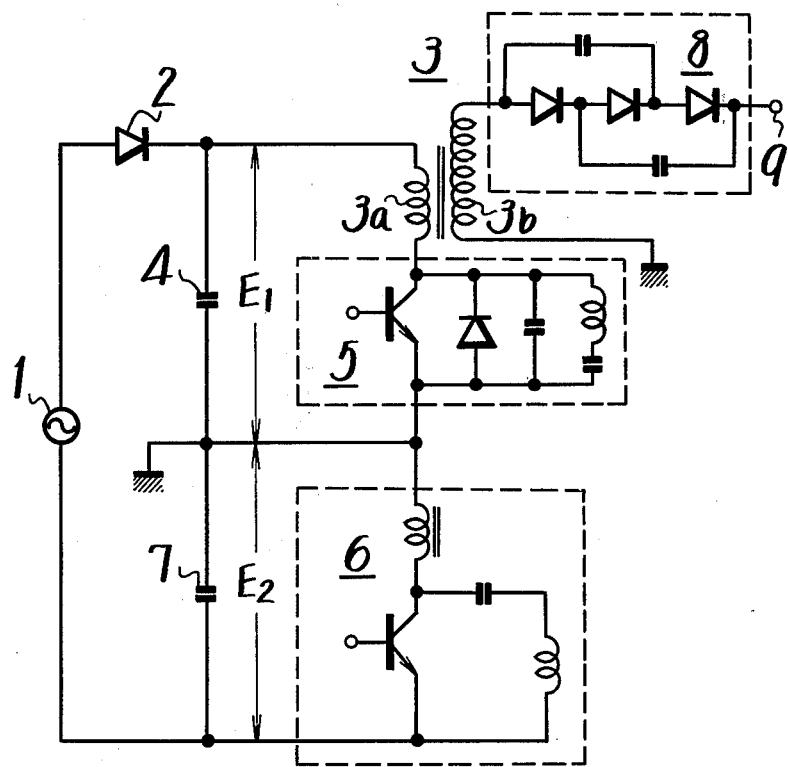
FIG. 1 is a circuit diagram showing an example of a power supply circuit according to the prior art.

Referring initially to FIG. 1, it will be seen that a conventional power supply circuit without a power transformer for use in a television receiver may include commercial electric power supply lines or an AC voltage source 1 of, for example, 100 volts. The AC voltage source 1 is shown to be connected, at one side, with the anode of a diode 2 having its cathode connected to one end of a primary winding 3a of a flyback transformer 3. A connection point between diode 2 and primary winding 3a of the flyback transformer 3 is grounded through a smoothing capacitor 4, while the other end of primary winding 3a is grounded through a horizontal deflection circuit 5. The other side of AC voltage source 1 is grounded through a vertical deflection circuit 6, and a connection point between that other side of AC voltage source 1 and vertical deflection circuit 6 is grounded through a smoothing capacitor 7. Further, one end of a secondary winding 3b of flyback transformer 3 is connected through a high voltage rectifier circuit 8 to a high voltage output terminal 9, and the other end of secondary winding 3b is grounded. A high voltage output derived from high voltage output terminal 9 may be supplied to the anode of a television picture tube (not shown).

With the circuit arrangement as described above, an AC voltage at source 1 is rectified by diode 2 to electrically charge capacitors 4 and 7, respectively. The voltages to which capacitors 4 and 7 are charged are in inverse proportion to the capacities of these capacitors. However, since load circuits, that is, horizontal deflection circuit 5 and vertical deflection circuit 6, are connected in parallel with capacitors 4 and 7, respectively, the voltages $E_1$ and $E_2$ applied across capacitors 4 and 7 in their stationary state are respectively determined by the impedances of the parallel loads, that is, the impedances of horizontal and vertical deflection circuits 5 and 6. In other words, the AC voltage of 100 volts at source 1 is rectified by diode 2, and if it is assumed that the impedances of horizontal and vertical deflection circuits 5 and 6 are equal to each other, these horizontal and vertical deflection circuits 5 and 6 will have equal DC voltages applied thereto, for example, of 50 volts each, respectively.

Thus, the previously proposed circuit is capable of supplying low DC voltages from a commercial electric power source to respective load circuits without requiring the use of a heavy and costly power transformer. In such conventional power supply circuit, however, if a current flowing through one load circuit, for example, a current flowing through the secondary winding 3b of flyback transformer 3, that is, a beam current flowing through a picture tube, varies in accordance with the brightness of the image on the screen of the picture tube, the voltages applied to the horizontal deflection circuit 5 and the vertical deflection circuit 6 will be varied. More specifically, if the beam current increases according to the brightness of the image on the screen of the picture tube, the current flowing through primary winding 3a increases and hence the current flowing through the horizontal deflection circuit 5 also increases. As a result of the current increase in load circuit 5, the impedance of horizontal deflection circuit 5, as viewed from voltage source 1, is apparently lowered, with the result that the DC voltage applied across horizontal deflection circuit 5 is lowered. Since the DC output voltage of diode 2 is constant, and if the impedance of vertical deflection circuit 6 is assumed to be constant, the DC voltage applied across vertical deflection circuit 6 will be increased with the result that the vertical deflection angle of the beam is increased to lengthen the produced picture or image in the vertical direction.

In accordance with the present invention, a power supply circuit of the type described above is provided with additional means by which DC voltages applied to loads are prevented from being veried even though a load impedance varies. Thus, when a power supply circuit according to this invention is applied, for example, to a television receiver, variations in the beam current flowing through the television picture tube in response to changes in the brightness of the image on the screen of the picture tube will not substantially change the respective voltages applied across the horizontal deflection circuit and the vertical deflection circuit of the television receiver.

Figure 2:
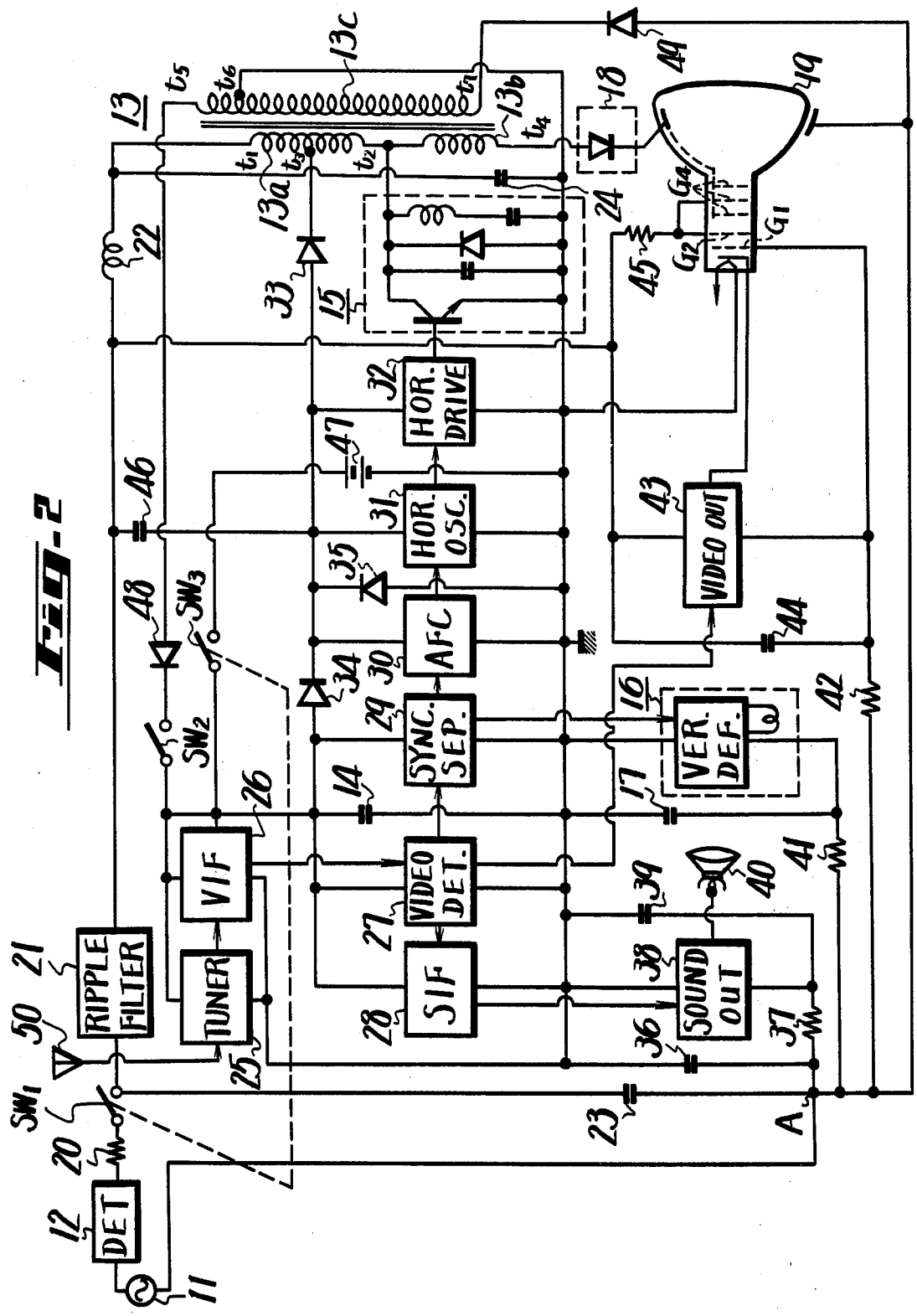
FIG. 2 is a circuit diagram showing one embodiment of a power supply circuit according to this invention.

Referring now to FIG. 2, it will be seen that, in one embodiment of a power supply circuit arrangement according to this invention which is shown applied to a television receiver capable of employing an AC-DC voltage source, a commercial electric power source 11, for example, an AC voltage source of 100 volts, has one side connected through a rectifier circuit 12 and a resistor 20 to a movable contact of a voltage source switch $SW_1$. The fixed contact of switch SW is connected through a ripple filter 21 and a choke coil 22 to a DC voltage terminal $t_1$ of a first primary winding 13a of a flyback transformer 13, while a terminal $t_2$ of the first primary winding 13a is grounded through a horizontal deflection circuit 15. A high voltage output terminal $t_4$ of a second primary winding 13b of flyback transformer 13 is connected through a high voltage rectifier circuit 18 to an anode of a picture tube 19. Further, the other side of AC voltage source 11 is connected through a smoothing capacitor 23 to the fixed contact of voltage source switch $SW_1$ so that an AC voltage of 100 volts is rectified and smoothed by rectifier circuit 12 and capacitor 23. A connection point between choke coil 22 and first primary winding 13a of the flyback transformer 13 is grounded through a smoothing capacitor 24.

The illustrated television receiver is further shown to include a tuner 25 and a video intermediate frequency amplifier circuit 26. One of the voltage source terminals of tuner 25 and of video intermediate frequency amplifier circuit 26, respectively, are connected to a movable contact of a connecting switch $SW_2$ and the other voltage source terminals of the tuner 25 and of the circuit 26, respectively, are connected to a common or ground terminal. Further, a connection point between the first-mentioned voltage source terminals of tuner 25 and circuit 26 and the movable contact of connecting switch $SW_2$ is connected, through smoothing capacitor 14, to the ground terminal. A video detector circuit 27, a sound intermediate frequency amplifier circuit 28, a synchronous separator circuit 29, an AFC(automatic frequency control) circuit 30, a horizontal synchronizing signal oscillator circuit 31 and a horizontal period drive circuit 32 are connected, as a voltage source system, in parallel with capacitor 14. One of the voltage source terminals of each of the respective circuits 27, 28, 29, 30, 31 and 32 is connected through a boosting diode 33 to an intermediate terminal $t_3$ of the first primary winding 13a of flyback transformer 13. Further, a reverse-current preventing diode 34 is connected between one of the voltage source terminals of the synchronous separator circuit 29 and of the AFC circuit 30, respectively, and a starting diode 35 is connected between the connection point of the voltage source terminals of circuit 30 and 31 and the ground.

A connection point A between the other side of AC voltage source 11 and capacitor 23 is connected through a smoothing capacitor 36 to the ground terminal and is also connected through a resistor 37 and a parallel circuit, consisting of a sound output circuit 38 and a smoothing capacitor 39, to the ground terminal. Thus, an output signal obtained from sound output circuit 38 is adapted to be applied to a speaker 40. Further, the connection point A is connected to the ground terminal through a resistor 41 and a parallel circuit, consisting of a smoothing capacitor 17 and a vertical deflection circuit 16, and connection point A is also connected through a resistor 42 to one of the voltage source terminals of a video output circuit 43, while a smoothing capacitor 44 is connected between the voltage source terminals of video output circuit 43. The voltage source terminal of video output circuit 43 which is connected to resistor 42 is also connected to the first grid $G_1$ of picture tube 19, and the other voltage source terminal of circuit 43 is connected through a resistor 45 to the second and fourth grids $G_2$ and $G_4$ of picture tube 19. An output terminal of video output circuit 43 is connected to the cathode of picture tube 19, and a conductive layer coated on the exterior wall surface of picture tube 19 is connected to connection point A. A connection point between the other voltage source terminal of video output circuit 43 and resistor 45 is connected to a connection point between ripple filter 21 and coil 22, while the connection point between coil 22 and ripple filter 21 is also connected through a capacitor 46 and diode 33 to intermediate terminal $t_3$ of first primary winding 13a of the flyback transformer 13. The capacitor 46 is functions to supply a kick voltage to the circuits, such as, horizontal period drive circuit 32 and the like, and to form a boost circuit together with diode 33, in its stationary state.

A connection point between capacitor 14 and one of the voltage source terminals of video intermediate frequency amplifier circuit 26 is connected to a movable contact of a connecting switch $SW_3$, while the fixed contact of switch $SW_3$ is connected through a storage battery 47 to the ground terminal. The movable contacts of switches $SW_1$ and $SW_3$ are ganged or linked to each other. Further, the fixed contact of connecting switch $SW_2$ is connected through a diode 48 to a terminal $t_5$ of a secondary winding 13c of flyback transformer 13, at which terminal $t_5$ there is produced a negative pulse which is rectified by diode 48 to obtain a low DC voltage.

In accordance with this invention, an intermediate terminal $t_6$ of secondary winding 13c is grounded, and a terminal $t_7$ of winding 13c is connected through a diode 49 to connection point A. A positive pulse generated at this terminal $t_7$ is rectified by diode 49 to obtain a predetermined low DC voltage.

With the above described circuit, when ganged switches $SW_1$ and $SW_3$ are closed and switch $SW_2$ is also closed, that is, when an AC voltage of 100 volts is supplied from AC voltage source 11, such AC voltage of 100 volts is rectified and smoothed by rectifier circuit 12 and capacitor 23, and hence the capacitor 23 has a DC voltage applied thereacross, for example, of +110 volts. This DC voltage of +110 volts is applied through ripple filter 21 to series-connected capacitors 24 and 36 and is divided thereby, with the voltages across capacitors 24 and 36, respectively, being applied to horizontal deflection circuit 15 and vertical deflection circuit 16, respectively. In this case, since a connection point between capacitors 24 and 36, and hence a connection point between circuits 15 and 16, is grounded, capacitors 24 and 36 have stored therein voltages which are of reversed polarity to each other. Thus, for example, horizontal deflection circuit 15 may have applied thereto a DC voltage of +70 volts, while vertical deflection circuit 16 may have applied thereto a DC voltage of −30 volts which is obtained from −40 volts by the voltage drop across resistor 41. Moreover, the negative pulse obtained at terminal $t_5$ of secondary winding 13c of the flyback transformer 13 is rectified by diode 48 and smoothed by capacitor 14 to produce a low DC voltage of, for example, +12 volts. This voltage of +12 volts is applied to those circuits, such as, horizontal oscillator circuit 31, horizontal drive circuit 32 and the like, which are connected in parallel with capacitor 14 and which require a positive low DC voltage. Further, sound output circuit 38 has applied thereto a negative DC voltage of −30 volts which is obtained, by reason of the voltage drop across resistor 37, from the voltage of −40 volts across capacitor 36. The video output circuit 43 has applied thereto a voltage of, for example, 100 volts, which is lower than the voltage across capacitor 23 by reason of the voltage drop across resistor 42. Finally, the positive pulse obtained at terminal $t_7$ of the secondary winding 13c of flyback transformer 13 is rectified by diode 49 and applied to sound output circuit 38 and vertical deflection circuit 16 together with the voltage across capacitor 36. Accordingly, the total voltage applied to vertical deflection circuit 16, in this case, is the sum of the voltage which is obtained by dividing the voltage across capacitor 23 in proportion to the respective impedances of horizontal and vertical deflection circuits 15 and 16, and of the voltage which is obtained as a result of the rectifying by diode 49 of the positive pulse derived from terminal $t_7$ of the secondary winding 13c of flyback transformer 13.

When switch $SW_2$ is opened, the voltage of +12 volts from storage battery 47 is supplied through switch $SW_3$ to those circuits, such as, horizontal oscillator circuit 31, horizontal drive circuit 32, and the like, which require a low positive DC voltage. In this case, a boost circuit is formed by the winding between terminals $t_1$ and $t_3$ of the first primary winding 13a of flyback transformer 13, capacitor 46 and diode 33. Thus, a voltage of 58 volts (70 − 12 = 58 volts) is produced across capacitor 46, and a voltage of +70 volts is obtained across capacitor 24.

In this case, a video signal received by an antenna 50 is supplied as indicated by arrows in FIG. 2. In other words, the video signal received by antenna 50 is supplied through tuner 25 and video intermediate frequency amplifier circuit 26 to video detector circuit 27. An audio signal derived from the video detector circuit 27 is supplied through sound intermediate frequency amplifier circuit 28 and sound output circuit 38 to speaker 40 for being reproduced thereby. A video signal derived from video detector circuit 27 is supplied to synchronous separator circuit 29 in which a horizontal period synchronizing signal and a vertical period synchronizing signal are separately obtained. The horizontal period synchronizing signal is supplied to AFC circuit 30 to control the oscillation frequency of horizontal signal oscillator circuit 31 and the output signal from the latter is supplied through horizontal drive circuit 32 to horizontal deflection circuit 15. The vertical period synchronizing signal is supplied from separator circuit 29 to the vertical deflection circuit 16. Further, the video signal derived from video detector circuit 27 is supplied to video output circuit 43 to derive therefrom an output signal which is supplied to the cathode of picture tube 19.

With the circuit according to this invention as described above, when the brightness of an image on the screen of picture tube 19 is increased, and hence the beam current of the picture tube 19 is increased, a current flowing through horizontal deflection circuit 15 is also increased and its impedance, as viewed from the voltage source side (hereinafter referred to as merely an impedance), is lowered, so that the voltage applied thereacross tends to be decreased. At such time, if the impedance of vertical deflection circuit 16 is assumed constant, the voltage applied across vertical deflection circuit 16 would be increased because the voltage across the capacitor 23 is constant. In the circuit according to the invention, however, the pulse voltage generated in flyback transformer 13 is reduced due to the drop in the impedance of horizontal deflection circuit 15, thereby to decrease the voltage which is obtained as a result of the rectifying, by diode 49, of the pulse from secondary winding 13c, and which is applied to vertical deflection circuit 16. Hence, the total voltage across vertical deflection circuit 16 is restrained from increasing, and the current flowing through vertical deflection circuit 16 as a result of the voltage applied thereto from diode 49 is decreased. Consequently, the current flowing through horizontal deflection circuit 15 is decreased from its increased value and hence its impedance is apparently increased or returned toward its original value. In other words, the ratio of the impedances of horizontal deflection circuit 15 and of vertical deflection circuit 16 is maintained substantially constant, and hence the DC operating voltages applied to these circuits 15 and 16 become stable.

Conversely, when the impedance of vertical deflection circuit 16 is varied, the respective DC voltages can be similarly stabilized. For example, if the current flowing through vertical deflection circuit 16 is increased for some reason to lower its apparent impedance with the result that the voltage applied across horizontal deflection circuit 15 will tend to be increased, the output voltage of diode 49 applied to vertical deflection circuit 16 is increased. In other words, the voltage applied from secondary winding 13c through diode 49 to the vertical deflection circuit 16 is increased to further increase the current flowing through circuit 16, and hence the current flowing through horizontal deflection circuit 15 is also increased, so that the apparent impedance of horizontal deflection circuit 15 is also lowered. Thus, the impedance ratio of horizontal deflection circuit 15 and vertical deflection circuit 16 is not varied with the result that the voltages applied across these circuits 15 and 16 become constant.

From the above, it will be apparent that in the circuit according to this invention, the pulse obtained at the output end of secondary winding 13c of the flyback transformer 13 is rectified by the diode 49 with the resulting voltage being applied to the vertical deflection circuit 16 so that the DC operating voltages respectively applied to horizontal deflection circuit 15 and vertical deflection circuit 16 are maintained constant.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention.

I claim as my invention:

1. A power supply circuit for supplying stabilized direct currents to at least first and second load circuits comprising:
   A. a direct current source means having a pair of output terminals and being operative to produce a DC voltage between said terminals,
   B. means connecting said first and second load circuits in series to each other between said pair of output terminals of said direct current source means so that said first and second load circuits have respective DC voltages applied thereacross in dependence on their respective impedances, and
   C. control means connected to said first load circuit for producing an additional direct current varying in response to variations in the DC voltage applied across said first load circuit, said control means being connected to said second load circuit for applying said additional direct current in series with the direct current from said direct current source means to said second load circuit to compensate for the variations in the DC voltage applied across said second load circuit that result from said variations in said DC voltage applied across said first load circuit.

2. A power supply circuit according to claim 1, wherein said DC voltage source means includes means adapted to be connected to an AC voltage source, and means for rectifying the AC voltage from said AC voltage source.

3. A power supply circuit according to claim 2, wherein said first load circuit includes a transformer as an inductive load having primary and secondary windings, and said control means includes a rectifying device having an input connected to said secondary winding and an output connected to a power supply terminal of said second load circuit to supply part of the current to said second load circuit and to affect the voltage applied to said first load circuit in response to variations in operation of said second circuit.

4. A power supply circuit according to claim 3, wherein said first load circuit includes an output stage of a horizontal deflection circuit and said transformer acts as a flyback transformer of said horizontal deflection circuit and said second load circuit includes a vertical deflection circuit.

5. A power supply circuit according to claim 4, wherein said rectifying device in said control means is constituted by a diode connected between said secondary winding of the flyback transformer and said power supply terminal of said vertical deflection circuit.

* * * * *